United States Patent
Sheng et al.

(10) Patent No.: US 9,580,362 B2
(45) Date of Patent: Feb. 28, 2017

(54) COATINGS FOR CERAMIC SUBSTRATES

(75) Inventors: Hong Sheng, Fengxian District (CN); Ming Wu, Guangdong (CN); Luc Moens, Sint-Genesius-Rode (BE); Alex Xia, Fengxian District (CN)

(73) Assignees: ALLNEX BELGIUM SA., Brussels (BE); CYTEC SURFACE SPECIALTIES (SHANGHAI) CO., LTD., Shanghai (CN)

( * ) Notice: Subject to any disclaimer, the term of this patent is extended or adjusted under 35 U.S.C. 154(b) by 597 days.

(21) Appl. No.: 13/502,575

(22) PCT Filed: Aug. 10, 2010

(86) PCT No.: PCT/CN2010/001214
§ 371 (c)(1),
(2), (4) Date: Jul. 9, 2012

(87) PCT Pub. No.: WO2011/066712
PCT Pub. Date: Jun. 9, 2011

(65) Prior Publication Data
US 2012/0270055 A1  Oct. 25, 2012

(30) Foreign Application Priority Data
Dec. 1, 2009 (WO) .............. PCT/CN2009/075237

(51) Int. Cl.
C04B 41/52 (2006.01)
B05D 5/06 (2006.01)
C04B 41/89 (2006.01)

(52) U.S. Cl.
CPC .............. *C04B 41/52* (2013.01); *C04B 41/89* (2013.01); *Y10T 428/31515* (2015.04)

(58) Field of Classification Search
CPC ............ C04B 41/45; B05D 5/06; C08B 41/52
USPC .... 427/202, 203, 372.2, 487, 532, 402, 403; 347/102
See application file for complete search history.

(56) References Cited

U.S. PATENT DOCUMENTS

| | | | |
|---|---|---|---|
| 4,143,181 A * | 3/1979 | Cahn et al. | 427/195 |
| 4,727,111 A | 2/1988 | Pettit, Jr. et al. | |
| 4,728,543 A * | 3/1988 | Kurauchi | B05D 7/53 427/407.1 |
| 6,087,469 A | 7/2000 | Epple et al. | |
| 6,258,897 B1 | 7/2001 | Epple et al. | |
| 6,461,419 B1 * | 10/2002 | Wu et al. | 106/31.6 |
| 6,623,763 B2 * | 9/2003 | Asmussen et al. | 424/489 |
| 6,982,137 B2 * | 1/2006 | Berghauser | 430/14 |
| 2004/0076766 A1 * | 4/2004 | Fey et al. | 427/551 |
| 2004/0081818 A1 * | 4/2004 | Baumann et al. | 428/323 |
| 2006/0088721 A1 * | 4/2006 | Mayo et al. | 428/500 |
| 2006/0188655 A1 * | 8/2006 | Reising et al. | 427/407.1 |
| 2007/0244258 A1 * | 10/2007 | Swarup et al. | 525/165 |
| 2007/0248761 A1 * | 10/2007 | Sharma | 427/407.1 |
| 2008/0194733 A1 * | 8/2008 | Green et al. | 523/160 |

FOREIGN PATENT DOCUMENTS

| | | |
|---|---|---|
| DE | 1 97 48 927 | 12/1998 |
| EP | 0 776 920 | 6/1997 |
| EP | 0 896 991 | 2/1999 |
| EP | 1 268 695 | 1/2003 |
| EP | 1 923 375 | 5/2008 |
| WO | 91/01748 | 2/1991 |
| WO | 2006/091440 | 8/2006 |
| WO | 2008/009540 | 1/2008 |
| WO | 2008/055921 | 5/2008 |
| WO | 2008/055922 | 5/2008 |

OTHER PUBLICATIONS

International Search Report issued Nov. 11, 2010 in International (PCT) Application No. PCT/CN2010/001214, of which the present application is the national stage.

\* cited by examiner

*Primary Examiner* — Cachet Sellman
(74) *Attorney, Agent, or Firm* — Wenderoth, Lind & Ponack, L.L.P.

(57) ABSTRACT

A process for making highly mechanical and chemical resistant ceramic substrates, especially tiles is provided, wherein the process comprises coating said substrates with a base coat layer of a thermosetting or radiation curable powder coating composition, curing the applied powder coating composition, and applying a further layer of a liquid coating composition and curing the composition by exposure to heat. Coated ceramic substrates, in particular tiles are also provided.

14 Claims, No Drawings

COATINGS FOR CERAMIC SUBSTRATES

FIELD OF THE INVENTION

The invention relates to a process for coating ceramic substrates with different coating compositions and to the ceramic substrates thereby obtainable. The invention further relates to a coating composition for ceramic substrates.

BACKGROUND OF THE INVENTION

Usually ceramic substrates such as tiles or sanitary fittings are coated with enamels in order to be highly decorative as well as scratch, wear and solvent resistant. However enameling consumes large amounts of energy and has limitations in view of decoration.

U.S. Pat. No. 4,143,181 relates to a method of applying a coating(s) composed of a primer and a topcoat on glass substrates. The primer, intended to protect the substrate from damage upon impact, is applied as a solution comprising a thermosetting binder composed of a hydroxy functional polyester; the powder topcoat serves for improving resistance to caustic soda and also comprises a thermosetting binder composed of a hydroxy functional polyester.

DE 19748927 relates to a method for obtaining a scratch resistant decorative or functional coating obtained from a thermosetting composition comprising polyester or polyurethane resins on heat resistant non metallic substrates. The substrate is heated to a temperature which is above the softening temperature of the coating to be applied. Subsequently the powder is applied to the heated substrate without the use of electrostatic field, the substrate itself being electrically insulated. The substrate then is transferred to an oven for curing the thermosetting powder. A two coat system is illustrated: a first black powder coating, a polyester TGIC system, is applied at a thickness of 200 microns and cured for 10 minutes. Subsequently a second clear layer of the same polyester TGIC system containing brass flakes is applied and cured for another 10 minutes in order to obtain a highly decorative coating.

WO 2008/055921 relates to a process for coating ceramic substrates with a powder coating composition comprising at least one polyester having carboxy- and/or hydroxy-functional groups and at least one hardener having functional groups reactable with the polyester functional groups as base coat, and with a coating composition comprising a radiation curable resin as further layer.

WO 2008/055922 relates to a process for coating ceramic substrates with a powder coating composition comprising at least one acrylic copolymer comprising carboxy hydroxy and/or glycidyl functional groups and at least one hardener having functional groups reactable with the acrylic copolymers' functional groups to the substrate. A powder primer layer is often first applied.

U.S. Pat. No. 6,982,137 relates to a method of forming color images on tiles or glass wherein the substrate is first coated with a clear powder polymer coating cured at 80% to 95%, then a xerographically color image is applied, finally another layer of the same polymer and then the system is heated to achieve complete cure.

None of these prior art coatings obtain a high decorative finish with outstanding mechanical and chemical performance, such as scratch resistance and chemical resistance. Hardness of the finishes proposed thus far was often not sufficient, and especially extreme hardness (3H-4H) in combination with outstanding solvent and heat shock resistance formed a technical challenge.

SUMMARY OF THE INVENTION

We have now found coatings that overcome some or all of the drawbacks described above. Therefore the present invention relates to a process for coating ceramic substrates (e.g. a tile), which process comprises applying as a base coat layer to the substrate a powder coating composition, curing the applied composition; and applying as a further layer a liquid coating composition, and curing the applied liquid composition by exposure to heat. The powder coating composition can be a thermosetting powder coating composition (A1) or a radiation curable powder coating composition (A2). Thermosetting powder coating compositions are preferred. Preferably the powder coating composition that is applied as a base coat comprises at least one polyester having carboxy- and/or hydroxy-functional groups and, typically, at least one hardener having functional groups reactable with the polyester functional groups. Advantageously this powder coating composition is a thermosetting powder coating composition.

DETAILED DESCRIPTION OF THE INVENTION

As used herein 'ceramic substrate' means a product manufactured by the action of heat on inorganic non-metallic materials, such as earthy raw materials. Ceramic substrates may typically predominantly comprise materials containing silicon with its oxide and complex compounds known as silicates. The ceramic substrate is preferably a structural clay product, such as a brick, tile, terra cotta or a glazed architectural brick.

Ceramic tiles are preferred, especially ceramic wall tiles and ceramic floor tiles, more in particular ceramic indoor wall tiles.

The thermosetting powder coating composition (A1) typically is cured thermally. The radiation curable powder coating composition (A2) typically is cured by exposure to radiation such as actinic radiation and/or ultraviolet light and/or ionizing radiation (such as electron-beams).

As used herein the term 'curing by exposure to heat' refers to both physical drying, air-drying, and stoving. Air-drying and more in particular stoving are preferred. 'Air drying' refers to a process whereby heat is extracted from the air and wherein certain groups of the resin react with oxygen from the air to crosslink, harden and dry. Often organic metal salts or 'driers' are added which catalyze the cross-linking. Oil drying agents in the form of metal complexes may be added to accelerate the drying. 'Stoving' or 'baking' or 'oven baking' refers to curing at moderate to elevated temperatures (in particular above 90° C.) in the presence of a cross-linking agent or hardener.

The term 'curing by exposure to heat' specifically excludes 'curing by exposure to radiation' whereby heat can be used to melt the resin, but whereby exposure to actinic radiation and/or to ultraviolet light (optionally in the presence of another ingredient such as a photo-initiator) and/or to ionizing radiation (such as electron-beam) is needed for curing (or cross-linking of the resin). In the process according to the invention the liquid coating composition advantageously is thermally cured.

In a first and preferred embodiment of the invention, the powder coating composition that is applied as a base coat layer onto the ceramic substrate (e.g. a tile) comprises at least one polyester having carboxy- and/or hydroxy-functional groups and at least one hardener having functional groups reactable with the polyester functional groups. Preferably the polyester is an amorphous polyester. Advantageously, the powder coating composition used is a thermosetting powder coating composition. The powder coating composition used in this first embodiment of the present invention is presented in the form of a fine powder which, once applied on the substrate and upon heating, forms a coating on the ceramic substrate, during which process at least part of the functional groups from the polyester react with at least part of the functional groups of the hardener.

The polyesters used in this first embodiment of the present invention are generally prepared from a polyacid component comprising from 70 to 100 mole % of aromatic polycarboxylic acids and/or their anhydrides, and from 0 to 30 mole % of aliphatic or cycloaliphatic polyacids and/or their anhydrides; and from a polyol component comprising from 70 to 100 mole % of aliphatic diols, and from 0 to 30 mole % of cycloaliphatic diols and/or of (cyclo)aliphatic polyols. By "(cyclo)aliphatic polyols" is meant to designate cycloaliphatic polyols or aliphatic polyols bearing more than two —OH groups.

The aromatic polycarboxylic acids are preferably terephthalic acid and isophthalic acid and mixtures thereof. The aliphatic diols are preferably selected from neopentyl glycol, propyleneglycol, 2-methyl-1,3-propanediol, 2-ethyl-2-butyl-1,3-propanediol, ethyleneglycol, diethyleneglycol, and mixtures thereof.

The polyesters used in this first embodiment of the present invention can be carboxy functional polyesters having e.g. an acid number (according to D0029300) of from 15 to 100 mg KOH/g, more preferably from 30 to 70 mg KOH/g, or can be hydroxy functional polyesters having e.g. a hydroxy number (according to D0067200) of from 15 to 300 mg KOH/g, more preferably from 30 to 100 mg KOH/g. Carboxy functional polyesters are preferred. By a "carboxy functional" polyester is meant a polyester with an acid number higher than the hydroxy number. By a "hydroxy functional polyester" is meant a polyester with a hydroxy number higher than the acid number.

The polyesters according to this first embodiment preferably have a number averaged molecular weight (Mn) ranging from 600 to 15000 as measured by gel permeation chromatography (GPC) using polystyrene as standard. Preferably the Mn is at least 1100. Preferably the Mn is at most 8500.

The polyesters according to this first embodiment preferably have a glass transition temperature (Tg) from 35 to 80° C., measured by Differential Scanning Calorimetry according to ASTM D3418 with a heating gradient of 20° C. per minute. The polyesters useable in the process of the present invention more preferably have a Tg>50° C.

The polyesters according to this first embodiment preferably have a Brookfield (cone/plate) viscosity according to ASTM D4287-88, ranging from 5 mPa·s, measured at 175° C., to 15000 mPa·s, measured at 200° C.

The polyesters used in this first embodiment of the present invention are known in the prior art and have been described for being used in metal coating.

When a carboxy functionalized polyester is used in this first embodiment of the present invention, the hardener comprising reactive groups reactable with the reactive groups of this polyester is preferably selected from polyepoxy compounds, β(beta)-hydroxyalkylamide containing compounds and their mixtures. Preferred are polyepoxy compounds which are solid at room temperature and which contain at least two epoxy groups per molecule. Triglycidyl isocyanurates, such as the one marketed under the name Araldite® PT810, blends of diglycidyl terephthalate and triglycidyl trimellitates, such as those commercialized under the name of Araldite® PT910 or Araldite® PT912, and bisphenol A based epoxy resins, such as those commercialized under the names Araldite® GT 7004 or D.E.R™ 692, are especially preferred. Acrylic copolymers containing glycidyl groups obtained from glycidyl methacrylate and/or glycidyl acrylate and other (meth)acrylic monomers and, optionally, other ethylenically mono-unsaturated monomers can also be used. A preferred acrylic copolymer is GMA-300 commercialized by Estron Chemical Inc and described in WO 91/01748.

β(beta)-hydroxyalkylamides which contain at least one, preferably two, bis(β(beta)-hydroxyalkyl)amide groups are especially preferred. Such compounds have for example been described in U.S. Pat. No. 4,727,111.

The hardener described herein above is generally used in an amount from 0.25 to 1.40, preferably from 0.60 to 1.05, equivalent of carboxy groups present in the polyester per equivalent of epoxy or β(beta)-hydroxyalkyl groups present in the hardener.

When a hydroxy functionalized polyester is used in this first embodiment of the invention, the hardener is preferably selected from blocked isocyanate cross-linking agents. Examples of blocked polyisocyanate cross-linking compounds include those which are based on isophorone diisocyanate blocked with ε(epsilon)-caprolactam, commercially available as VESTAGON® B 1530, Ruco® NI-2 and Cargill® 2400 or toluene-2,4-diisocyanate blocked with ε(epsilon)-caprolactam, commercially available as Cargill® 2450, and phenol-blocked hexamethylene diisocyanate.

Another class of blocked polyisocyanate compounds which may be employed are adducts of the 1,3-diazetidine-2,4-dione dimer of isophorone diisocyanate and a diol, wherein the ratio of NCO to OH-groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70 to 130° C. Such an adduct is commercially available under the name VESTAGON® BF 1540.

The hardener is generally used in an amount from 0.3 to 1.4; preferably from 0.7 to 1.2, equivalent of hydroxy groups present in the polyester per equivalent of (blocked or non-blocked) isocyanate present in the hardener.

The powder coating composition used as base coat layer in this first embodiment of the present invention may comprise besides the binder comprising one or more polyesters and one or more hardeners as described here above, other additives, fillers and/or pigments commonly used in powder coating compositions.

In a preferred embodiment of the invention the powder based coat is pigmented. The powder coating composition used in this first embodiment of the invention advantageously further comprises at least one pigment and/or colorant and/or filler well known in the art. One may also add to the powder coating composition pigments that provide special effects such as brass flakes, metallic pigments, and pearlescent pigments described in e.g. DE 19748927 and WO 2008/09540. Examples of metallic pigments include copper, nickel and/or aluminum pigments. Alternatively the powder coat may be a clear coat.

The powder coating composition used in this first embodiment of the present invention preferably comprises from 30% to 97% by weight of polyester; from 3% to 50%, more preferably from 3 to 60% by weight of hardener; from 0% to 50%, more preferably from 5% to 30%, by weight of colorant and/or pigment and/or fillers and from 0% to 10% by weight of other additives.

The components of the powder coating composition used in this first embodiment of the present invention may be mixed by dry blending in a mixer or blender, for example a drum mixer. The premix is then usually homogenized at temperatures ranging from 70 to 150° C. in a single screw or double screw extruder. The extrudate, when cooled down, is ground to a powder, preferably with a particle size ranging from 10 to 150 μm.

The powder coating composition used in this first embodiment of the present invention can be applied to the ceramic substrate by any powder-coating process. The powdered composition may be deposed on the ceramic substrate by use of a powder gun such as an electrostatic CORONA gun or TRIBO gun. On the other hand well known methods of powder deposition such as the fluidized bed technique can be used.

In a second embodiment of the invention, a radiation curable powder coating composition (A2) is applied as a base coat layer onto the ceramic substrate (e.g. a tile). Such radiation curable powder coating compositions are well known in the art. Preferably this radiation curable powder coating composition comprises at least one (meth)acryloyl group containing polyester (A21) and/or at least one (meth) acryloyl group containing epoxy resin (A22). By "(meth) acryloyl" is meant acryloyl, methacryloyl and mixtures thereof. Preferably the polyester (A21) is an amorphous polyester as disclosed in EP1268695. Preferably the epoxy resin (A22) is a polyphenoxy resin as disclosed in EP1268695, the content of which is incorporated herein by reference.

Preferred in this second embodiment of the invention, is a radiation curable powder coating composition (A2) which comprises:
  from 10 to 90 weight percentage of at least one (meth) acryloyl group containing amorphous polyester (A21);
  from 10 to 60 weight percentage of at least one (meth) acryloyl group containing polyphenoxy resin (A22); and
  from 0 to 30 weight percentage of at least one compound (A23) selected from ethylenically unsaturated oligomers and/or from (meth)acryloyl group containing semi-crystalline polyesters;
the weight percentages based on the total weight of the components (A21), (A22), and (A23).

As these ethylenically unsaturated oligomers and semi-crystalline polyesters contain polymerisable double bounds, they also participate in the radiation curing and can consequently provide coatings with an improved flow and a surface hardness which is further increased. Depending on the envisaged applications, the powder coating compositions (A2) of the present invention can contain from 0 to 20, or 2 to 10 parts by weight of ethylenically unsaturated oligomer and/or from 0 to 30, or from 5 to 20 parts by weight of at least one semi-crystalline polyester per 100 parts of compounds (A21), (A22) and (A23) of the composition.

Amorphous polyesters containing (meth)acryloyl groups (A21) preferably exhibit a degree of unsaturation of from 0.15 to 1.80, particularly from 0.35 to 1.25 milliequivalents of double bounds per gram of polyester. These polyesters (A21) in addition preferably have:

a number average molecular weight (Mn) from 1100 to 16000, preferably between 1300 and 8500, measured by gel permeation chromatography (GPC);
  a glass transition temperature (Tg) determined by differential scanning calorimetry (DSC) according to ASTM D3418-82, from 35 to 80° C.; and
  a viscosity in the molten state measured at 200° C. with a cone/plate viscometer (known under the name of ICI viscosity) according to ASTM D4287-88, from 1 to 20000 mPa·s.

(Meth)acryloyl group containing polyphenoxies (A22) preferably exhibit a degree of unsaturation of from 0.2 to 6.0, particularly from 0.5 to 4.5 milliequivalents of double bounds per gram of resin. These (meth)acryloyl group containing polyphenoxies (A22) in addition preferably have:
  a number average molecular weight (Mn) from 500 to 5000, preferably between 650 and 3500, measured by gel permeation chromatography (GPC);
  a glass transition temperature (Tg) determined by differential scanning calorimetry (DSC) according to ASTM D3418-82, from 30 to 80° C.; and
  a viscosity in the molten state measured at 200° C. with a cone/plate viscometer (known under the name of ICI viscosity) according to ASTM D4287-88, from 1 to 25000 mPa·s.

Examples of ethylenically unsaturated oligomers (A23) that can be used in the powder coating composition (A2) include the triacrylate and the tri(meth)acrylate of tris(2-hydroxyethyl)isocyanurate, the epoxy acrylates and methacrylates which are formed by the reaction of an epoxy compound (for example, the diglycidyl ether of Bisphenol A) with acrylic or methacrylic acid, the urethane acrylates and methacrylates which are formed by the reaction of an organic di- or polyisocyanate with an hydroxyalkylacrylate or a hydroxyalkylmethacrylate and optionally a mono- and/or polyhydroxylated alcohol (for example, the reaction product of hydroxyethyl(meth)acrylate with toluenedi-isocyanate or isophoronedi-isocyanate), the acrylic acrylates or methacrylates, such as, for example, the reaction product of (meth)acrylic acid with a copolymer containing glycidyl groups obtained by copolymerisation of acrylic monomers, such as n-butylmethacrylate and methylmethacrylate, and the like.

The components of this powder coating composition (A2) used in the process according to the invention may be mixed by dry blending in a mixer or blender, for example a drum mixer. The premix is then usually homogenized at temperatures ranging from 70 to 150° C. in a single screw or double screw extruder. The extrudate, when cooled down, is ground to a powder, preferably with a particle size ranging from 10 to 150 μm.

The powder coating composition (A2) can be applied to the ceramic substrate by any powder-coating process. The powdered composition may be deposed on the ceramic substrate by use of a powder gun such as an electrostatic CORONA gun or TRIBO gun. On the other hand well known methods of powder deposition such as the fluidized bed technique can be used. Deposition is typically followed by the melting of the coating thus obtained such, as by heating at a temperature of 80 to 150° C. for a time of e.g. approximately 0.5 to 10 minutes, and by the curing of the coating in the molten state by e.g. UV irradiation or by accelerated electron beams. UV irradiation typically is done in the presence of at least one photo-initiatior chosen from those commonly used for this purpose, in concentrations standard applied.

In a preferred embodiment of the invention the powder based coat thus prepared is pigmented. The powder coating composition (A2) used in the process according to the invention advantageously further comprises at least one pigment and/or colorant and/or filler well known in the art. One may also add to the powder coating composition pigments that provide special effects such as brass flakes, metallic pigments, and pearlescent pigments described in e.g. DE 19748927 and WO 2008/09540. Examples of metallic pigments include copper, nickel and/or aluminum pigments. Alternatively the powder coat may be a clear coat.

In a preferred embodiment of the process according to the invention the ceramic substrate, e.g. a tile, is first preheated to a temperature above the glass transition temperature of the powder coating composition, more preferably the substrate is preheated until it has a temperature of from 60 to 200° C. The powder (thermosetting or radiation curable) then is applied to the preheated substrate, preferably without the use of an electrical field and more preferably ensuring that the substrate is thermally and electrically insulated. After deposition the ceramic substrate containing the powder is generally heated to a temperature between 120 and 300° C. for a curing time of from 1 to 60 minutes, causing the particles to flow and fuse together to form a smooth, uniform, continuous, uncratered coating on the substrate surface.

In a preferred embodiment of the process according to the invention the ceramic substrate, e.g. a tile, is mechanically polished (e.g. with sand) before applying the (thermosetting or radiation curable) powder coating composition of the invention.

In general no chemical pretreatment is needed, unless e.g. greasy dirt would be present on the surface of the ceramic substrate.

Preferably the ceramic substrate used in the invention (in any embodiment) is non-glazed, more in particular is a non-glazed ceramic tile.

In any embodiment, the process according to the invention the substrate can be coated with more than one powder coating composition as described here above. In this case, the coating compositions can be the same or different.

In a preferred embodiment of the invention the ceramic substrate may be coated with a single powder coating to form an optionally pigmented single layer base coat. A single layer base coat prepared from a powder coating composition according to the first embodiment of the invention may optionally comprise i) a (further) carboxy or hydroxy functional polyester with a suitable hardener as described above and/or ii) a highly hydroxy functional polyester with an anhydride hardener (such as that available commercially from Cytec under the trade name BECKO-PDX™ EH694) and/or an isocyanate hardener as described above (such as that available commercially from Cytec under the trade name ADDITOL® 932) and/or iii) a carboxy functional acrylic polymer with a Bisphenol-A derived epoxy resin; and/or iv) a thermally cured unsaturated polyester.

In another preferred embodiment of the invention the ceramic substrate may be coated sequentially with two different powder coatings to form a two layer base coat (either layer of which may be optionally pigmented). In the case of a base coat prepared from a powder coating composition according to the first embodiment of the invention, each layer may optionally comprise any of the materials (i), (ii), (iii) and/or (iv) described in the above embodiment for a single base layer.

In any embodiment, the powder coating composition used in the present invention is preferably applied directly on the ceramic substrate without any (other) primer coating being applied before applying the powder coating composition.

The thickness of the layer comprising the powder coating composition according to any embodiment is generally from 25 to 250 μm (micrometers) after curing. The thickness of this layer is preferably at least 50 μm (micrometers) so that any defects in the surface of the substrate are rendered invisible.

In the process according to any embodiment of the invention, a liquid coating composition is applied as a further coating layer. Most preferably the liquid layer(s) forms the exterior layer of the ceramic substrate, e.g. a ceramic tile. Preferably the liquid layer forms the topcoat.

The liquid coating composition used in the process according to the invention preferably comprises at least one resin chosen from the list consisting of (i) an alkyd resin or its hybrid; (ii) an acrylic resin or its hybrid; (iii) a polyester resin or its hybrid; (iv) a polyurethane dispersion or its hybrid; (v) a hydroxylated polyol; (vi) an organic silicone; (vii) a phenolic resin, possibly in combination with an epoxy resin; and (viii) a polyester resin in combination with an acrylic resin. Preferably the liquid coating composition comprises at least one of the following resins: (i) an acrylic resin or its hybrid; (ii) a polyester resin or its hybrid; (iii) a polyurethane dispersion or its hybrid; (iv) a hydroxylated polyol; or (v) an organic silicone.

The term 'hybrid' refers to a physical or a chemical modification of the resin by reaction. Suitable hybrids are well known in the art. Examples of hybrids include e.g. acrylic-polyurethane hybrid emulsions or dispersions using an acrylic-polyurethane graft copolymer. Another example forms the core shell technology, with e.g. an alkyd core and an acrylic shell for optimal performance.

In a preferred embodiment of the invention, the liquid coating composition comprises at least one acrylic resin and/or at least one polyester resin. Most preferably the liquid coating composition that is used comprises at least one acrylic resin and at least one polyester resin. Preferably the acrylic resin is a hydroxylated acrylic resin. Preferably the polyester resin is a hydroxylated polyester resin.

In the above the term "acrylic resin" includes acrylic resin hybrids. Similarly the term "polyester" includes polyester resin hybrids.

An example of a suitable acrylic resin hybrid is an acrylic resin modified with a polyester for improving film flexibility. Some examples of suitable polyester hybrids are provided below.

The acrylic resin used in the liquid coating composition of the invention optionally is a hydroxylated acrylic resin. The acrylic resin used may be water-borne but preferably is solvent-borne. Solvent-borne acrylic resins may be thermoplastic but preferably are thermosetting acrylic resins. Most preferably the acrylic resin used is a solvent-borne hydroxylated acrylic resin that preferably is thermosetting.

The acrylic resins are preferably characterized by a mass fraction of solids above 50%, more preferably of at least 55%, most preferably or at least 60% (determined according to DIN EN ISO 3251). Preferable the mass fraction of solids does not exceed 99%.

The acrylic resins preferably have a dynamic viscosity of their solutions (according to DIN EN ISO 3219 at 23° C.) of between 50 and 40000 mPa·s. Preferably the viscosity is at least 500 mPa·s, more preferably at least 700 mPa·s. Preferably the viscosity is at most 10000 mPa·s, more preferably at most 8000 mPa·s, most preferably at most 6000 mPa·s.

Preferably the acrylic resins used have a hydroxyl (OH) number on the solid resin (according to DIN EN ISO 4629) of between 10 and 300 mg KOH/g. Preferably the OH number is at least 35 mg KOH/g, more preferably at least 50 mg KOH/g. Preferably the OH number is at most 200 mg KOH/g, more preferably at most 150 mg KOH/g.

The polyesters used in the liquid coating composition according to the invention may be water-borne but preferably are solvent-borne. Preferably the polyester is a hydroxylated polyester, more in particular a solvent-borne hydroxylated polyester.

The polyesters may be linear, branched or slightly branched. Branched polyesters are preferred. The polyesters used are preferably characterized by a mass fraction of solids of at least 60%, advantageously of at least 70%, more preferably of at least 75% (determined according to DIN EN ISO 3251). Preferable the mass fraction of solids does not exceed 99%.

The polyester solutions are preferably characterized by a dynamic viscosity (according to DIN EN ISO 3219 at 23° C.) of from 50 to 35000 mPa·s. Preferably the viscosity is at least 500 mPa·s, more preferably at least 1000 mPa·s, most preferably at least 1500 mPa·s. Preferably the viscosity is at most 30000 mPa·s, more preferably at most 25000 mPa·s, most preferably at most 20000 mPa·s.

Preferably the polyesters used have a hydroxyl (OH) number on the solid resin (according to DIN EN ISO 4629) of between 10 and 300 mg KOH/g. Preferably the OH number is at least 80 mg KOH/g, more preferably at least 100 mg KOH/g, most preferably at least 150 mg KOH/g. Preferably the OH number is at most 250 mg KOH/g.

Particularly suited polyesters are low molar mass polyester polyols having e.g. a weight-average molar mass (Mw) of not more than 2000 g/mol, especially those having a hydroxyl number of from 80 to 300 mg KOH/g and an acid number of from 5 to 35 mg KOH/g as described in U.S. Pat. No. 6,258,897 and U.S. Pat. No. 6,087,469, the content of which is incorporated herein by reference.

Such polyesters are preferably obtained from the reaction of amount-of-substance fractions in the reaction mixture of: a) from 1 to 45% of aliphatic polycyclic polyhydroxy compounds having at least two hydroxyl groups per molecule, b) from 5 to 50% of branched aliphatic acyclic dihydroxy compounds, c) from 30 to 50% of aliphatic cyclic polycarboxylic acids, d) from 0 to 30% of aliphatic acyclic or monocyclic polyhydroxy compounds having three or more hydroxyl groups per molecule, and e) from 0 to 10% of polyfunctional compounds selected from aliphatic linear and monocyclic dihydroxy compounds, aliphatic linear and branched dicarboxylic acids, aromatic dicarboxylic acids, aromatic hydroxycarboxylic acids, and polycarboxylic acids having three or more carboxyl groups per molecule, and also f) from 0 to 10% of monofunctional compounds selected from monocarboxylic acids and monoalcohols. The amount-of-substance fractions indicated in each case under a), b), c), d), e) and f) advantageously are adding up to 100%

Examples of suitable polyester polyols for use in the liquid coating composition according to the invention and examples of suitable solvents for those polyester polyols can be found in U.S. Pat. No. 6,258,897 and U.S. Pat. No. 6,087,469, the content of which is incorporated herein by reference.

The low molar mass polyester polyols may be chemically or physically modified by reaction, for example, with isocyanate compounds or compounds which comprise oxirane groups. Other possible modifications include the incorporation of low molar mass urea derivatives. The polyester polyols may also be the basis of (grafted-on) acrylate polymers, such as described in U.S. Pat. No. 6,258,897, EP 0776920 and EP 0896991, the content of which is incorporated herein by reference.

In a preferred embodiment of the invention the liquid coating composition comprises at least one acrylic resin and at least one polyester resin in a ratio of polyester resin: acrylic resin of between 4:1 and 2:1, preferably between 3.5:1 and 2.5:1, more preferably between 3.2:1 and 2.2:1, most preferably between 3:1 and 2.2:1.

Preferably the liquid coating composition used in the process according to the invention further comprises at least one hardener. Suitable hardeners are well known in the art.

The (optionally hydroxylated) polyesters and/or (optionally hydroxylated) acrylic resins used in the liquid coating composition according to the invention can be cured in any desired way. Possible hardeners (or cross-linkers) include (blocked or non-blocked) polyisocyanates, amino resins, phenolic resins, polycarboxylic acids and their anhydrides (see e.g. U.S. Pat. No. 6,258,897).

Polyisocyanates in non-blocked form may be used for curing at moderate temperatures or at room temperature. For curing at elevated temperature, blocked polyisocyanates and also polycarboxylic acids and their anhydrides are additionally suitable.

Amino resins are preferred hardeners (or curing agents), more in particular urea resins, melamine resins and/or benzoguanamine resins. These are etherified urea-, melamine- or benzo-guanamine-formaldehyde condensation products, respectively. Particularly preferred are melamine resins and especially high solids methylated melamine resins such as hexamethoxymethylmelamine resins.

"High solids" in this context refers to a mass fraction of solids of at least 70%, in particular at least 75%, preferably at least 95%. Suitable hardeners are e.g. hexamethoxymethylmelamine resins with a mass fraction of solids above 98%. Other preferred examples include high imino resins with a mass fraction of solids in the range of 78% to 82%.

Preferably an acid catalyst is added when amino resins are used as hardener. In an embodiment of the invention the liquid coating composition used further comprises an acid catalyst.

Fully alkylated amino resins often require a strong acid catalyst such as CYCAT® 4045, whereas partially alkylated and high imino resins in general only need a weak acid catalyst. Also urea and glycoluril resins respond better to a strong acid catalyst.

Examples of possible catalysts include amine blocked p-toluene sulfonic acid (pTSA), dimethyl pyrophosphate (DMAPP), dodecylbenzenesulfonic acid (DDBSA) and dinonylnaphthalenedisulfonic acid (DNNDSA). Preferred catalysts are amine blocked p-toluene sulfonic acids like ADDITOL® VXK 6395 and CYCAT® 4045.

Preferably the mass fraction of the resin(s) in the liquid coating composition is between 10% and 90%. Preferably the mass fraction of the resins is at least 20%, more preferably at least 50%. Preferably the mass fraction of the resins is at most 85%, more preferably at most 80%.

Preferably the mass fraction of the hardener in the liquid coating composition is between 5% and 70%. Preferably the mass fraction of the hardener is at least 10%, more preferably at least 12%. Preferably the mass fraction of the hardener is at most 40%, more preferably at most 25%.

The ratio of the mass fractions of the resin(s) and the hardener(s) preferably is between 6:1 and 1:1, more in particular between 5:1 and 2:1.

Preferably the mass fraction of the optional acid catalyst in the liquid coating composition is between 0% and 10%, more in particular between 0.1% and 10%. Preferably the mass fraction of the optional catalyst is at least 0.3%. Preferably the mass fraction of the optional catalyst does not exceed 8%.

The liquid coating composition according to the present invention can be applied from solutions or dispersions in water but preferably is applied from solutions in organic solvents.

Examples of suitable solvents for the resins and in particular the preferred oligoester polyols and/or acrylic resins of the invention include aliphatic, cycloaliphatic and aromatic hydrocarbons, such as alkylbenzenes, e.g., xylene, toluene; esters, such as ethyl acetate, butyl acetate, acetates with longer alcohol residues, butyl propionate, pentyl propionate, ethylene glycol monoethyl ether acetate, the corresponding methyl ether acetate, and propylene glycol methyl ether acetate; ethers, such as ethylene glycol monoethyl, monomethyl or monobutyl ether; glycols; alcohols; ketones such as methyl isoamyl ketone and methyl isobutyl ketone; lactones, and mixtures of such solvents. Further solvents which can be employed include reaction products of lactones with glycols or alcohols. Particularly preferred are mixtures of a dimethylester (like DME-1, a santosol dimethylester of adipic, glutaric & succinic acid) and S-100 (an aromatic hydrocarbon solvent from HuaLun Chemistries). Butanol may help stabilize paint storage.

The mass fraction of the optional solvents in the liquid coating composition typically is between 0% and 50%. Preferably the mass fraction of the optional solvents is at least 5%, more preferably at least 10%. Preferably the mass fraction of the optional solvents is at most 40%, more preferably at most 30%.

The liquid coating composition used in the method of the invention may further comprise pigments and/or colorants and/or fillers. Examples of fillers include talc, mica, kaolin, chalk, quartz flour, slate flour, various silicas, silicates, etc. The mass fraction of the optional pigments and/or colorants and/or fillers in the liquid coating composition preferably is between 0% and 50%, more preferably between 2% and 40%.

Preferably however the liquid layer, which preferably forms a top coat, is substantially transparent (clear) i.e. substantially free of colored ingredients such as pigments. The liquid coating composition used in the method according to the invention is preferably a clear coat comprising no colorant and/or pigment and/or filler. Preferably, the liquid coat layer forming the top coat is a clear coat. Between the powder base coat and the liquid top coat, that preferably is a clear coat, one or more other layers may be present, such as another liquid layer, a radiation curable ink layer (e.g. a radiation curable inkjet ink layer) etc.

The liquid coating composition used in the present invention can also contain other ingredients, e.g. auxiliaries or additives customary in coating technology that have not yet been mentioned. These include, in particular, slip and leveling agents; silicone oils; additives such as cellulose esters, especially cellulose acetobutyrate; plasticizers, such as phosphates and phthalates; viscosity modifiers; flow modifiers; matting agents; UV absorbers and light stabilizers; antioxidants and/or peroxide scavengers; defoamers and/or wetting agents; dispersing agents, active diluents/reactive diluents, and the like. The mass fraction of the optional other ingredients of the liquid coating composition preferably is between 0% and 5%. Preferably the mass fraction of optional ingredients is at least 0.2%. Preferably the mass fraction of optional ingredients is at most 2%, more preferably at most 1%.

In a preferred embodiment of the invention the liquid coating composition used comprises from 10% to 90% by weight, usually from 30% to 90% by weight, preferably from 50% to 90% by weight of resins; from 5% to 40% by weight, more preferably from 10% to 40% by weight of hardeners; optionally, from 5% to 40% by weight of solvents; optionally, from 0% to 8% by weight of acid catalysts; optionally, from 0% to 50% by weight of colorants and/or pigments and/or fillers; and optionally, from 0% to 2% by weight of additional ingredients.

The liquid coating composition resin can be applied to the ceramic substrate by any coating process suitable thereto. Examples thereof are brushing, dipping, flow coating, roller coating or blade coating, but especially by spraying. They can be applied with heat and, if desired, be brought into an application-ready form by injection of supercritical solvents (e.g. $CO_2$).

After the coating of the substrate with the liquid coating composition, the latter is cured. Curing, i.e. crosslinking can be achieved by any suitable means well known to those skilled in the art.

For the purpose or the invention, the liquid coating materials are generally cured within a temperature range from 20° C. to 160° C., preferably from 23° C. to 140° C. in for example from five minutes to ten days, more in particular from 15 minutes to 120 minutes.

In the process according to the invention, the substrate can be coated with more than one liquid coating composition as described here above. In this case, the liquid coating compositions can be the same or different. In an embodiment of the present invention, two liquid coating layers are provided on a tile with a powder base coat layer, which can be the same or different. For instance, a pigmented liquid layer can be applied before applying a liquid clear coat as top coat. Alternatively both liquid coating layers can be clear coats.

The thickness of the layer comprising the liquid coating composition is generally from 1 to 120 μm (micrometers), preferably from 10 to 80 μm, more preferably from 20 to 70 μm after curing. The liquid coating composition can be applied directly on the powder base coat(s), or one or more intermediate layers may be applied between the powder base coat and the liquid coat, which preferably is a liquid top coat.

In a preferred embodiment, the process of the invention comprises a further step of providing a color image to the ceramic substrate, e.g. a tile. By "color image" is meant an image, print or design of at least one color, possibly multiple colors. Color images with multiple colors are often preferred. The term "color" includes special colors like gold, silver, metal etc.

Preferably the color image is applied after the step of coating the ceramic substrate with a powder base coat and before the step of applying as a further layer a liquid coating composition. Preferably the ceramic substrate, e.g. a tile, is first mechanically polished (e.g. with sand) before applying the color image. In a preferred embodiment of the process according to the invention the ceramic substrate, more in particular the ceramic tile coated with a powder base coat, is polished before applying the color image, advantageously after having applied the powder base coat and possibly also before applying the powder base coat.

In a preferred embodiment of the invention, the color image is applied to the ceramic substrate, e.g. a tile, using e.g. a printing-ink sublimation technique, more in particular dye-sublimation printing.

A possible way to provide the color image to the ceramic substrate, e.g. a tile is by heat transfer printing. Heat transfer papers well known in the art may for instance be used. One may use heat transfer papers commercially available, or create one own's designs using a computer or color copier for printing on suitable papers.

In its simplest from, a transfer sheet is pressed against the ceramic substrate coated with a powder base coat layer and the backing layer is peeled off. Other ways to provide the image are described in U.S. Pat. No. 6,982,137, the content of which is incorporated herein by reference.

Suitable equipment like heat transfer printing machinery is also well known in the art and commercially available. Typically a xerographically produced color image, which has been applied to a backing sheet, is pressed to the powder base coat at a pressure of e.g. about 40 psi with a press temperature of e.g. about 180° C. to 220° C. for about 10 minutes to 30 minutes e.g., allowing the material to cool, and applying thereto the further liquid layer. Other suitable techniques for forming images on ceramic substrates such as ceramic tiles exist and may be used, such as UV photo-imaging. Particularly suited is e.g. the use of UV curable inkjet inks.

In a particularly preferred embodiment, a color image is applied via inkjet printing technology. Various companies have specialized in the provision of radiation curable inkjet inks, more in particular UV curable inkjet inks (also referred to as UV digital inks). Radiation curable inkjet inks, and more in particular UV curable inkjet inks, suited for use in the method of the invention are commercially available nowadays. Various suppliers exist for UV inkjet inks like Sunjet, Sericol etc., which inks can be used for printing on coated ceramic substrates (e.g. tiles).

Some examples of designs or prints that can be provided using a method according to the invention: imitation marbles, wood veins, metallic colors etc. In contrast therewith, glazed tiles due to the high baking conditions (>1200° C.) can often not meet the demands of high decoration.

The process according to the invention permits to obtain ceramic substrates, especially tiles, which present a high decorative finish as well as outstanding mechanical and chemical performances, such as scratch resistance, stain resistance and chemical resistance. This makes these tiles e.g. suitable for being used in bathrooms, kitchens and other environments where high resistance is necessary.

Especially stain resistance, gloss and colorfulness were often better than for glazed tiles. Flexibility with respect to pigment selection is higher and high decoration images and designs can be obtained for a wide range of glosses. Compared to traditional glazing techniques the method of the invention consumes less energy and is more environment friendly. The process of the invention allows e.g. to reduce energy consumption by 90% compared to traditional glazing techniques. The bake temperature is e.g. much lower, typically around 200° C. High temperature equipment as used in a traditional glazing and firing process is thus not required.

An aspect of the invention concerns ceramic substrates, especially tiles, which can be obtained (or are obtainable) by the process of the invention. The present invention in particular relates to ceramic substrates, especially tiles, comprising at least one base coat layer (A) obtained from a powder coating composition as described above; and at least one further layer (B) obtained from a liquid coating composition as described above. The present invention in particular relates to ceramic substrates, especially tiles, comprising at least one base coat layer obtained from a thermosetting powder coating composition (A1) or from a radiation curable powder coating composition (A2) as described above; and at least one further layer (B) obtained from a liquid coating composition as described above. In a preferred embodiment according to the invention, the ceramic substrates, especially tiles, comprise at least one base coat layer (A) obtained from a powder coating composition comprising at least one carboxy and/or hydroxy functional polyester and at least one hardener having functional groups reactable with the polyesters' functional groups; and at least one further layer (B) obtained from a liquid coating composition as described above. Preferably the powder coating composition as used herein is a thermosetting powder coating composition. Another embodiment of the invention relates to ceramic substrates, especially tiles, comprising at least one base coat layer (A) obtained from a radiation curable powder coating composition comprising at least one (meth)acryloyl group containing polyester (A21) and/or at least one (meth)acryloyl group containing epoxy resin (A22); and at least one further layer (B) obtained from a liquid coating composition as described above.

In a preferred embodiment of the invention the ceramic substrates, in particular the tiles, of the invention have a pencil hardness (according to Scratch Hardness Tester according to Wolff Wilborn) of at least 2H, preferably at least 3H, more preferably at least 4H. Even a pencil hardness of 5H or 6H can be achieved with a method of the invention.

In a preferred embodiment of the invention the powder base coat layer on the ceramic substrate is pigmented and the liquid layer provided directly on top of this base coat layer is a clear coat. Alternatively the liquid layer is pigmented.

In another preferred embodiment of the invention, both the powder coat and the liquid coat are clear coats, and a color image is provided to the tile before applying the liquid coat. Alternatively the base coat layer is pigmented and provides a background color for the color image provided on top of it (e.g. a white color). The color image may be provided by any suitable means, using e.g. a printing-ink sublimation technique based on e.g. heat transfer papers, or an inkjet printing technology based on e.g. UV inkjet inks.

In yet another preferred embodiment of the invention, both the powder coat and the liquid coat are clear coats, and a pigmented liquid coating composition is applied between the powder base coat and the liquid top coat. In a particular embodiment of the present invention this (first) liquid layer comprises pigments that provide a special effect (e.g. a metallic effect). Instead of being a clear coat the powder base coat can also be pigmented, for instance be white.

Preferably the top coat (in any of the embodiments) is a liquid top coat, more preferably a liquid clear coat.

The optional pigment (in any of the above) can be organic and/or inorganic.

Another aspect of the invention concerns a liquid coating composition for ceramic substrates comprising (i) at least one acrylic resin and/or at least one polyester resin, and (ii) at least one melamine hardener. Suitable acrylic resins and polyester resins have been described above. Preferably the acrylic resin is a hydroxylated acrylic resin and the polyester is a hydroxylated polyester. Optional further compounds and/or ingredients for the liquid coating composition have been described above.

EXAMPLES

The examples which will follow illustrate the invention without limiting it.

Preparation Example 1

Synthesis of a Carboxy-Functional Polyester PE1

408.37 g of neopentyl glycol was placed in a conventional four neck round bottom flask equipped with a stirrer, a distillation column connected to a water cooled condenser, an inlet for nitrogen and a thermometer attached to a thermoregulator. The flask contents were heated, while stirring under nitrogen, to a temperature of circa 130° C. at which point 532.59 g of terephthalic acid, 59.18 g of adipic acid and 2.00 g of n-butyltintrioctoate were added. The heating was continued gradually to a temperature of 230° C. Water was distilled from the reactor from 180° C. on. When distillation under atmospheric pressure stopped, a vacuum of 50 mm Hg 6666 Pa) was gradually applied. After three hours at 230° C. and 50 mm Hg, a polyester with following characteristics was obtained: AN: 3 mg KOH/g, OHN: 42 mg KOH/g.

The reaction mixture was then cooled to 170° C.-190° C. followed by the addition of 119.18 g of trimellitic anhydride. The temperature was maintained at 180° C. until the reaction mixture became clear.

A carboxy functional polyester with following characteristics was obtained: AN=72 mg KOH/g, OHN=6 mg KOH/g, Brookfield (175° C.) viscosity (cone/plate)=10.000 mPa·s; Tg (DSC, 20 K/min)=58° C.

Preparation Example 2

Synthesis of a Carboxy-Functional Polyester PE2

423.82 g of neopentyl glycol were placed in the reactor and heated, while stirring under nitrogen, to a temperature of circa 130° C. at which point 720.34 g of isophthalic acid and 2.5 g of n-butyltintrioctoate were added. The heating was continued gradually to a temperature of 230° C. and water was distilled from the reactor from 180° C. on. When distillation under atmospheric pressure stopped, a vacuum of 50 mm Hg was gradually applied. After three hours at 230° C. and 50 mm Hg, a carboxy functional polyester with following characteristics was obtained: AN: 32 mg KOH/g; OHN: 2 mg KOH/g; Brookfield (200° C.) viscosity (cone/plate): 3000 mPa·s; Tg (DSC, 20 K/min): 57° C.

Preparation Example 3

Synthesis of a Hydroxy-Functional Polyester PE3

A mixture of 439.94 g of neopentyl glycol and 14.14 g of trimethylolpropane was placed in a reactor and heated, while stirring under nitrogen, to a temperature of circa 130° C. at which point 645.62 g of terephthalic acid, 33.98 g of adipic acid and 2.5 g of n-butyltintrioctoate were added. The heating was continued gradually to a temperature of 230° C. and water was distilled from the reactor from 180° C. on. When distillation under atmospheric pressure stopped, a vacuum of 50 mm Hg was gradually applied. After three hours at 230° C. and 50 mm Hg, a hydroxy-functional polyester with following characteristics was obtained: AN: 3 mg KOH/g; OHN: 32 mg KOH/g; Brookfield (200° C.) viscosity (cone/plate): 7800 mPa·s; Tg (DSC, 20 K/min): 56° C.

Preparation Example 4

Synthesis of a Carboxy-Functional Polyester PE4

421.17 g of neopentyl glycol was placed in the reactor and heated, while stirring under nitrogen, to a temperature of circa 130° C. at which point 605.51 g of terephthalic acid and 1.5 g of n-butyltintrioctoate were added. The heating was continued gradually to a temperature of 230° C. Water was distilled from the reactor from 180° C. on. When distillation under atmospheric pressure stopped, 0.5 g of tributylphosphite and 110.33 g of isophthalic acid were added. Heating was continued for 2 hours at 230° C. and 0.7 g of tributylphosphite and 0.5 g of n-butyltintrioctoate was added. Then a vacuum of 50 mm Hg was gradually applied in 1 hour. After two hours at 230° C. and 50 mm Hg, a carboxy functional polyester with following characteristics was obtained: AN: 35 mg KOH/g; OHN: 4 mg KOH/g; Brookfield (200° C.) viscosity (cone/plate): 5700 mPa·s; Tg(DSC, 20 K/min): 62° C.

The polyester is cooled down to 200° C. and 0.5 g of n-butyltriphenylphosphonium bromide, 2.5 parts of Irganox 1076 and 2.5 g of Hostanox PAR 24 were added. After 0.5 hours of mixing at 200° C. the reactor is emptied.

Reference Examples 1 to 3

The polyesters resins of Preparation Examples 1 to 3 were formulated into a black powder accordingly the following formulations:

TABLE 1

| Powder composition 1 | | Powder composition 2 | | Powder composition 3 | |
| --- | --- | --- | --- | --- | --- |
| Composition | Quantity (g) | Composition | Quantity (g) | Composition | Quantity (g) |
| PE 1 | 27.24 | PE 2 | 38.14 | PE 3 | 47.94 |
| Epoxy hardener Araldite ® GT7004 | 27.24 | Epoxy hardener Araldite ® GT7004 | 16.34 | Hardener Vestagon BF1530 | 6.54 |
| Carbon Black FW2 | 1.06 | Carbon Black FW2 | 1.06 | Carbon Black FW2 | 1.06 |
| Blanc Fix F | 21.60 | Blanc Fix F | 21.60 | Blanc Fix F | 21.60 |
| Benzoin | 0.35 | Benzoin | 0.34 | Benzoin | 0.35 |
| Modaflow P6000 | 0.99 | Modaflow P6000 | 0.99 | Modaflow P6000 | 0.99 |

The powders of, respectively, Powder Compositions 1 to 3 were applied on non-polished tiles. Hereto, the tile was preheated for 10 minutes at 200° C. and then transferred to a wooden support in order to have electrical insulation. Subsequently the powder was sprayed using a Gema Volstatic PCG1 without the application of an electrical field at a layer thickness of 160 µm (micrometers). The tile then was transferred to a convection oven where it was cured for 30 minutes at 200° C.

Preparation Example 5

Synthesis of a Polyester Polyol

A 2-liter four-neck flask equipped with stirrer, heater, water separator and inert gas inlet was charged with 2.45 mol of 3(4),8(9)-bishydroxymethyl-tricyclo-[5.2.1.02,6]decane, 1.35 mol of neopentyl glycol, 4.0 mol of hexahydro phthalic anhydride and 2.2 mol of trimethylol propane. The starting components were heated under nitrogen to 200° C. and the water of reaction formed was removed continually. The temperature was increased continuously to 220° C. until the acid number was below 25 mg KOH/g.

Thereafter the polyester polyol was cooled to 120° C. and diluted and adjusted with butyl acetate to a mass fraction of solids of 78% (determined according to DIN EN ISO 3251). The final product was clear and had the following characteristics: acid number 21.0 mg KOH/g, hydroxyl number 219 mg KOH/g, dynamic viscosity (determined according to DIN EN ISO 3219) 10838 mPa·s, weight average molar mass Mw was 1315 g/mol, and the polydispersity U was 1.6, determined as supra.

Preparation Example 6

Synthesis of a Hydroxylated Acrylic Resin HAR1

A 2-liter four-neck flask equipped with stirrer, heating and cooling system, inert gas inlet and feed device was charged with 369 g solvent naphtha 150/180 (hydrocarbon mixture with a boiling range of from 150° C. to 180° C.) and this initial charge was rendered inert with nitrogen and heated to 148° C. Thereafter a mixture of 360 g styrene, 325 g butyl acrylate, 176 g 2-hydroxyethyl methacrylate and 18 g acrylic acid was metered in via the dropping funnel over the course of 6 hours. Simultaneously, 26 g di-t-butyl peroxide dissolved in 88 g solvent naphtha (as supra) was metered in. After 6 hours the temperature was maintained at 148° C. for 2 hours. Then the mixture was cooled to 120° C. and diluted and adjusted with 120 g of butyl acetate to a mass fraction of solids of 60% (determined according to DIN EN ISO 3251). The final product was clear and had the following characteristics: acid number 17.0 mg KOH/g, hydroxyl number 91 mg KOH/g, dynamic viscosity (determined according to DIN EN ISO 3219) 1487 mPa·s, weight average molar mass Mw was 10460 g/mol, and the polydispersity U=Mw/Mn was 4.0, where Mn is the number average molar mass, all determined via GPC with polystyrene standards.

Preparation Example 7

Synthesis of a Hydroxylated Acrylic Resin HAR2

A 1-liter four-neck flask equipped with stirrer, heating and cooling system, inert gas inlet and feed device was charged with 65 g n-butanol and 100 g xylene. This initial charge was rendered inert with nitrogen and heated to reflux (approx. 122° C.). Thereafter a mixture of 150 g methyl methacrylate, 130 g butyl methacrylate, 115 g 2-ethylhexyl acrylate, 90 g 2-hydroxyethyl methacrylate and 8 g acrylic acid was metered in via the dripping funnel over the course of 6 hours while maintaining reflux (temperature rises gradually to 128° C.). Simultaneously, 7 g tert-butyl peroxy-2-ethylhexyanoate dissolved in 50 g xylene was metered in. After 6 hours dosing was finished and the temperature was maintained further at 128° C. for 2 hours. Then the mixture was cooled to 120° C. and diluted and adjusted with 40 g xylene to a solids content of 65% by mass (according to DIN EN ISO 3251) to yield 755 g of resin. The end product was clear and had the following characteristics: acid number 13.0 mgKOH/g, dynamic viscosity (according to DIN EN ISO 3219) 17709 mPa·s, weight average molar mass was Mw 23471 g/mol, the polydispersity U was 2.7.

Formulations

The resin of Example 5 is formulated in the coating formulation of Example 8.

Example 8

Amounts are in grams

Comp. A:

| | | |
|---|---|---|
| 80.00 | Polyester of Example 5 | |
| 7.50 | Methyl amyl ketone | |
| 1.85 | Butyl glykol acetate | |
| 3.15 | Methoxy propyl acetate | |
| 1.15 | Troysol S 366 | 1) |
| 1.06 | Metatin 712/1% in xylene | 2) |
| 0.55 | Tinuvin 292 | 3) |
| 1.60 | Tinuvin 1130 | 3) |
| 1.90 | Methyl amyl ketone | |
| 0.44 | Butylglycol acetate | |
| 0.80 | Methoxy propyl acetate | |

Comp. B:

| | | |
|---|---|---|
| 47.30 | Desmodur N 3300 | 4) |
| 18.90 | Methyl amyl ketone | |
| 12.60 | Butylglycol acetate | |

The resin of Example 6 is formulated in the coating formulation of Example 9.

Example 9

Amounts are in grams

Comp A:

| | | |
|---|---|---|
| 64.40 | Acrylic of Example 6 | |
| 18.40 | CYMEL ® MB-14-B | 5) |
| 1.60 | n-Butanol | |
| 1.60 | Butylglycol acetate | |
| 6.90 | Isobutyl acetate | |
| 2.00 | Troysol S 366 | 1) |
| 0.80 | Tinuvin 292 | 3) |
| 2.80 | Tinuvin 1130 | 3) |
| 1.50 | Butyl acetate | |

Comp B:
26.20 Solvent naphtha 150/180
7.50 Butyl acetate

A (3/1)-blend of the polyester of Example 5 and the acrylic resin of Example 6 is formulated in the coating formulation of Example 10. Amounts below are in weight percentages.

Example 10

| % | Comp A | |
|---|---|---|
| 38.3 | Polyester of Example 5 | |
| 12.4 | Acrylic of Example 6 | |
| 16.2 | CYMEL ® 3629 | 5) |
| 2 | Modaflow 9200 (10%) | 6) |
| 2 | BYK 333 (10%) | 7) |
| 0.3 | Cycat 4045 | 8) |
| 6 | N-butanol | |
| 6 | DME-1 | 9) |
| 16.8 | S-100 | 10) |

A (3/1)-blend of the polyester of Example 5 and the acrylic resin of Example 6 is formulated in the coating formulation of Example 11. Amounts below are in weight percentages.

Example 11

| % | Comp A | |
|---|---|---|
| 38.3 | Polyester of Example 5 | |
| 12.4 | Acrylic of Example 6 | |
| 16.2 | CYMEL ® 303 LF | 5) |
| 4 | Modaflow 9200 (10%) | 6) |
| 3 | Additol VXL 4930 (10%) | 11), * |
| 0.3 | Cycat 4045 | 8) |
| 6 | N-butanol | |
| 6 | DME-1 | 9) |
| 3.8 | S-100 | 10) |
| 10 | IRGANOX ® 1010 (20%) | 12) |

* can be BYK 333 (10%) – 7)

1) Slip- and levelling agent (Troy Chem. Comp.)
2) Catalyst (Acima AG)
3) UV absorber (Ciba Geigy AG)
4) Crosslinker (Bayer AG)
5) Crosslinker (Cytec Ind.)
6) Flow Modifier (Cytec Ind.)
7) Slip- and wetting agent (BYK Chemie)
8) Catalyst (Cytec Ind.)
9) Santosol dimethylesters of adipic, glutaric & succinic acid (Cytec Ind.)
10) Aromatic hydrocarbon solvent, HuaLun Chem. Ind. Co. Ltd)
11) Slip- and wetting agent (Cytec Ind.)
12) Antioxidant (Ciba)

The coating compositions, described above are prepared in a manner well known to those skilled in the art.

For the coating composition of Examples 8, 9, 10 and 11, the components of Comp A first are well mixed. For the coating composition of Example 8, Comp B is added shortly before processing and the flow time (spray viscosity) of the resulting mixture is adjusted to 21 sec with the flow cup (DIN 52 211, 23° C.) with further diluents. For the coating composition of Example 9, the spray viscosity is adjusted to 21 sec with the flow cup through the addition of the solvent mixture of Comp B.

The coatings then are sprayed using a high volume low pressure spray gun with a nozzle of 1.8 mm and a pressure at the nozzle of 0.7 bar at a dry film layer thickness of about 40 μm.

Test Results

Example 12

The coating formulation of Example 8 is sprayed on the tile coated with the powder composition 1, as described earlier, standing at a temperature of from room temperature to 80° C. After 30 min curing at 80° C., the tile is cooled down for evaluation.

Example 13

The coating formulation of Example 9 is sprayed on the tile coated with the powder composition 3, as described earlier, standing at room temperature. 10 minutes after application of the coating, the temperature is increased to 130° C. After 30 minutes at 130° C., the tile is cooled down for evaluation.

Example 14

The coating formulation of Example 10 is sprayed on the tile coated with the powder composition 2, as described earlier, standing at a temperature of from room temperature to at 180° C. After application of the coating, the temperature is maintained for 30 minutes at 180° C. The tile then is cooled down for evaluation.

Example 15

The coating formulation of Example 11 is sprayed on the tile coated with the powder coating composition 8, standing at a temperature of from room temperature to at 180° C. After application of the coating, the temperature is maintained for 30 minutes at 180° C. The tile then is cooled down for evaluation. Powder coating composition 8 is given in Table 6, see infra.

Test results are summarized in Table 2.

In this table:

Column 1: indicates the pencil hardness according to Scratch Hardness Tester according to ISO 15184

Column 2: indicates the 60° gloss measured according to ASTM D523

Column 3: indicates the craze crack resistance according to ISO 10545-11

Column 4: indicates the chemical resistance according to ISO 10545-13. The following were tested amongst others: resistance to HCl (3%) and to KOH (30 g/l)

Column 5: indicates the stain resistance according to ISO 10545-14

Column 6: indicates the heat shock resistance according to ISO 10545-9. Materials were tested for 15 cycles under 150 to 15 degree Celsius Column 7: indicates the weather resistance according to ISO 4582

TABLE 2

| Liquid coating composition | Hardness | Gloss | Crack resistance | Chemical resistance | Stain resistance | Heat shock resistance | Weather resistance |
|---|---|---|---|---|---|---|---|
| Example 12 | Good | Excellent | Good | Excellent | Excellent | Excellent | Excellent |
| Example 13 | Excellent | Excellent | Good | Good | Good | Good | Good |
| Example 14 | Excellent | Excellent | Excellent | Excellent | Excellent | Excellent | Excellent |
| Example 15 | Very good to Excellent | Excellent | Excellent | Excellent | Very good to Excellent | Very good to Excellent | Excellent |

The tiles obtained in, respectively, Examples 12 to 15 as well as the tiles obtained in Reference Examples 1 to 3 prove a very smooth finish without any craters and/or defects.

The results in this table show that the ceramic tiles obtained by the process of the invention (Examples 12 to 15) have a very good crack as well as heat shock resistance together with excellent gloss and hardness. A pencil hardness of 3H to 4H or more can be obtained with a method of the invention. Even a pencil hardness of 5H or 6H can be achieved with a method of the invention. Tiles obtained in Example 15 exhibited an improved overbake resistance compared to those obtained in Example 14.

Ceramic tiles that were having a powder layer only (Reference examples 1 to 3), or ceramic tiles with a liquid base coat and a powder top coat did not give the desired properties. For instance hardness was not sufficient.

Preparation Example 16

Synthesis of a (meth)acyloyl Containing Amorphous Polyester

Step 1

A mixture of 369.7 parts of neopentyl glycol, 10.2 parts of trimethylolpropane along with 2.1 parts of n-butyltin trioctoate catalyst is placed in a conventional four-neck round bottom flask. The flask contents are heated while stirring, under nitrogen to a temperature of circa 140° C. Thereupon 528.7 parts of terephthalic acid along with 27.8 parts of adipic acid are added while stirring and the mixture is gradually heated to a temperature of 230° C. Distillation starts from about 190° C. After about 95% of the theoretical quantity of water is distilled and a transparent prepolymer is obtained, the mixture is cooled down to 200° C.

The hydroxyl functionalised prepolymer thus obtained, is characterised by:

| | |
|---|---|
| AN = | 10 mg KOH/g |
| OHN = | 51 mg KOH/g |

Step 2

To the first step prepolymer standing at 200° C., 96.5 parts of isophthalic acid are added. Thereupon the mixture is gradually heated to 225° C. After a two-hour period at 225° C. and when the reaction mixture is transparent, 0.8 parts of tributylphosphite are added and a vacuum of 50 mm Hg is gradually applied.

After 3 hours at 225° C. and 50 mm Hg, following characteristics are obtained:

| | |
|---|---|
| AN = | 37 mg KOH/g |
| OHN = | 2 mg KOH/g |
| ICI200° C. = | 5,400 mPa · s |

Step 3

The carboxyl functionalised polyester is cooled down to 150° C. and 0.9 parts of di-t-butylhydroquinone along with 4.6 parts of ethyltriphenylphosphonium bromide are added. Subsequently 77.3 parts of glycidylmethacrylate is slowly added (30 minutes) while stirring under oxygen. An hour after the addition is ended, a methacryloyl unsaturated polyester, with the following characteristics is obtained:

| | |
|---|---|
| AN = | 5 mg KOH/g |
| OHN = | 39 mg KOH/g |
| unsaturation = | 1.0 meq/g |
| ICI200° C. = | 3,800 mPa · s |
| Tgquenched(DSC 20°/min) = | 56° C. |
| Mn (GPC) = | 4,000 |

Preparation Example 17

Synthesis of a (meth)acryloyl Containing Polyphenoxy Resin

In a conventional four-neck round bottom flask equipped with a stirrer, an inlet for oxygen, an inlet for (meth)acrylic acid and a thermocouple attached to a thermoregulator, 910 parts of Araldite GT7004 (a Bisphenol-A-polyphenoxy resin, with a EEW of 715-750 and a softening point of 95-101° C.) are heated under oxygen to a temperature of 140° C. Subsequently 0.8 parts of ethyltriphenylphosphonium bromide are added and the addition of 90 parts of acrylic acid containing 0.2 parts of di-t-butylhydroquinone, is started. The acrylic acid addition is completed in a 3 hour period. One and an half hour after the completion of the acrylic acid addition, a resin with the following characteristics is obtained:

| | |
|---|---|
| AN = | 7 mg KOH/g |
| unsaturation = | 1.24 meq/g |
| ICI$^{200°\ C.}$ = | 700 mPa · s |
| Tg$^{quenched}$(DSC 20°/min) = | 49° C. |
| Mn (GPC) = | 1,650 |

Formulations

Examples 18 and 19

Example 18

White powders are prepared from the unsaturated polyester of Example 16

Example 19

White powders are prepared from a blend (1/1) of the unsaturated polyester of Example 16 and the epoxy resin of Example 17. The formulation of these powders is as follows:

TABLE 3

| Powder composition 5 | | Powder composition 6 | |
| --- | --- | --- | --- |
| Composition | Quantity (in g) | Composition | Quantity (in g) |
| Binder of Example 18 | 750.0 | Binder of Example 19 | 750.0 |
| Kronos 2310 [1] | 250.0 | Kronos 2310 [1] | 250.0 |
| Irgacure 2959 [2] | 12.5 | Irgacure 2959 [2] | 12.5 |
| Irgacure 819 [3] | 12.5 | Irgacure 819 [3] | 12.5 |
| Resiflow PV5 [4] | 10.0 | Resiflow PV5 [4] | 10.0 |

[1] Titanium dioxide, Kronos
[2] α-hydroxyketone, Ciab
[3] bisacylphosphine oxide, Ciba
[4] Fluidity regulating agent, Worlee Chemie Powder compositions 5 and 6 are prepared by dry mixing the (meth)acryloyl group containing resins and the photo-initiator with the various additional substances conventionally used for the manufacture of powder paints. The mixture obtained is homogenised at a temperature of approximately 70 to 140° C. in a Prism 16 mm (L/D=15/1) twin screw extruder (from the company Prism), and the extrudate is ground in a grinder of Alpine 100UPZ (from the company Alpine). To complete, the powder is sieved in order to obtain a size of the particles between 10 and 110 μm.

Coating of the Tiles

The powders of, respectively, Powder Compositions 5 and 6 are applied on non-polished ceramic tiles. Hereto, the tile is preheated for 10 minutes at 200° C. and then transferred to a wooden support in order to have electrical insulation. Subsequently the powder is sprayed using an electrostatic spray gun at a voltage of 60 kV at a layer thickness of 160 μm (micrometers). The coatings deposited, after melting, are then subjected to irradiation with ultraviolet light emitted by a 160 W/cm Gallium-doped followed by a 160 W/cm medium-pressure mercury vapour UV-bulb (Fusion UV Systems Ltd.) with a total UV-dose of 4000 mJ/cm2.

Then the coating formulation of Example 11 is sprayed on the tiles coated with the powder compositions 5 and 6 respectively, as described earlier, standing at a temperature of from room temperature to at 180° C. After application of the coating, the temperature is maintained for 30 minutes at 180° C. The tiles then are then cooled down for evaluation.

Example 20

A Powder coating composition 7 as described in Table 4 was prepared. The Powder coating composition thus prepared was applied on sand-polished tiles. Tiles were preheated for 10 minutes at 200° C. and then transferred to a wooden support in order to have electrical insulation. Subsequently the powder was sprayed using a Gema Volstatic PCG1 without the application of an electrical field at a layer thickness of 200 μm (micrometers). The tile then was transferred to a convection oven where it was cured for 30 minutes at 200° C.

Thereafter, the polyester coated tile was sand-polished, followed by a step of design transfer of an image using heat transfer papers (Shanghai Tinayu Banner Factory). The paper is covered on the tile with a powder coating and was heated for 20 minutes at 200° C. After this step, the coating formulation of Example 10 was sprayed onto the tiles, as described earlier, standing at a temperature of from room temperature to at 180° C. After application of the coating, the temperature is maintained for 15 minutes at 180° C. The tile then is cooled down for evaluation. Thickness of the top coat: 60 μm (micrometers).

TABLE 4

| Powder composition 7 | |
| --- | --- |
| Composition | Quantity (weight %) |
| PE 1 | 25 |
| Epoxy hardener DER663U | 25 |
| Silica Powder | 40 |
| MODAFLOW ® P 6000 | 1 |
| Benzoin | 0.5 |
| Ceridust 3910 | 1.5 |
| R-706 | 6 |
| AEROXIDE ® Alu C | 0.3 |

DER663U is an expoxy hardener from Dow Chemical. Ceridust 3910 is a white bi-stearyl ethylene-diamide wax from Clariant Pigments and Additives. R-706 stands for the DuPont™ Ti-Pure® rutile titanium dioxide pigment from DuPont. AEROXIDE® Alu C is an aluminum oxide from Degussa-Evonik.

Test results are summarized in Table 5:

TABLE 5

| Liquid coating composition | Hardness | Gloss | Crack resistance | Chemical resistance | Stain resistance | Heat shock resistance |
| --- | --- | --- | --- | --- | --- | --- |
| Example 20 | Excellent >3H | Excellent 95 | Excellent | Excellent | Excellent | Excellent |

The above shows that highly decorative finishes of excellent quality can be obtained with the method of the invention.

Example 21

Tests are repeated as described in Example 20, but now using a powder coating composition 8 as described in Table 6 for the base coat, and a coating formulation of Example 11 for the liquid top coat. Powder coating composition 8 can herein be replaced by powder coating composition 9.

TABLE 6

| Powder composition 8* | | Powder composition 9* | |
|---|---|---|---|
| Composition | Quantity (weight %) | Composition | Quantity (grams) |
| PE 4 | 37.2 | PE4 | 361.6 |
| PT-810 | 2.8 | PT-810 | 28.4 |
| CaCO3 | 48 | CaCO3 | 480 |
| MODAFLOW ® P 6000 | 1.5 | MODAFLOW ® P 6000 | 15 |
| Benzoin | 0.5 | Benzoin | 5 |
| Ceridust 3910 | 1 | Ceridust 3910 | 10 |
| R-706 | 8 | R-706 | 80 |
| HCO | 0.8 | 10% AT-168 master batch | 9 |
| AEROXIDE ® Alu C | 0.2 | 10% AT-76 master batch | 9 |

PT-810: Epoxy hardener Araldite® PT 810 (TGIC) crosslinker from Huntsman. HCO: Hydrogenated castor oil (100%) from shanghai Wen Hua Chemical Pigment CO; Ltd. CaCO3: Filler from Shanghai Da Yu Chem Biochemistry Co; Ltd. AT-168 and AT-76 are heat stabilizers from Ningbo Jinhai Albemarle Chemical and Industry Co; Ltd.
*If desired, a clear coat can be prepared by replacing Titanium Dioxide with Calcium Carbonate (CaCO3).

Powder compositions 8 and 9 were found to improve overbake resistance.

Test results are summarized in Table 7:

TABLE 7

| Liquid coating composition | Hardness | Gloss | Crack resistance | Chemical resistance | Stain resistance | Heat shock resistance |
|---|---|---|---|---|---|---|
| Example 21 | Excellent | Excellent | Excellent | Excellent | Excellent | Excellent |

Example 22

A Powder coating composition 8 as described in Table 6 was prepared. The Powder coating composition thus prepared was applied on sand-polished tiles. Tiles were preheated for 10 minutes at 200° C. and then transferred to a wooden support in order to have electrical insulation. Subsequently the powder was sprayed using a Gema Volstatic PCG1 without the application of an electrical field at a layer thickness of 200 μm (micrometers). The tile then was transferred to a convection oven where it was cured for 30 minutes at 200° C. and then cooled down to room temperature. Thereafter, the powder coated tile was polished.

On top of the powder base coat a commercial UV inkjet ink (FLORA digital printing System from ShenZhen Runtianzhi image Technology Co., Ltd) was applied at a layer thickness of 8-10 μm. The inkjet ink is cured with a medium pressure Hg lamp which is attached on the inkjet printing machine. The tile is ready for the next operation almost immediately.

After applying this UV inkjet layer, the coating formulation of Example 11 was sprayed onto the tiles, as described earlier, standing at a temperature of from room temperature to at 180° C. After application of the coating, the temperature is maintained for 15 minutes at 180° C. The tile then is cooled down for evaluation. Thickness of the top coat: 60 μm (micrometers).

Compared to Examples 20 and 21, tiles produced as described here exhibited better overbake- and chemical resistance. In addition the color image was of a higher quality.

Test results are summarized in Table 8:

TABLE 8

| Liquid coating composition | Hardness | Gloss | Crack resistance | Chemical resistance | Stain resistance | Heat shock resistance |
|---|---|---|---|---|---|---|
| Example 22 | Excellent | Very good to Excellent | Very good to Excellent | Excellent | Very good to Excellent | Excellent |

The above example is repeated, but now with the following UV ink(s) applied on the powder coated tiles at a final thickness of 8-10 μm.

| | Parts by weight | | | |
|---|---|---|---|---|
| Ingredients | Yellow | Cyan | Magenta | Black⊙ |
| Pigment | 2.5 | 3 | 3 | 3 |
| EBECRYL ® 151 [1] | 22.2 | 11.75 | 11.85 | 11.75 |
| ADDITOL ® S 130 [2] | 0.25 | 0.15 | 0.15 | 0.15 |
| Dispersion Synergist [3] | 0.05 | 0.1 | | |
| EBECRYL ® 152 [4] | 60 | 69.5 | 69.5 | 69.6 |
| EBECRYL ® 145 [5] | 10 | 10 | 10 | 10 |

-continued

| | Parts by weight | | | |
|---|---|---|---|---|
| Ingredients | Yellow | Cyan | Magenta | Black☉ |
| Photoinitiator Blend | 4.5 | 5 | 5 | 5 |
| Flow and leveling Additives | 0.5 | 0.5 | 0.5 | 0.5 |

[1] Grinding resin (Cytec Ind.)
[2] Stabiliser (Cytec Ind.)
[3] Examples include Solsperse 22000 & 5000
[4] Modified diacrylate improving pigment dispersion stability and jetting characteristics (Cytec Ind.)
[5] Propoxylated (2) neopentyl glycol diacrylate (Cytec Ind.)

The resin of Example 7 is formulated in the coating formulation of Example 23.

Example 23

Amounts are in weight percentages

| | Comp A: | |
|---|---|---|
| 22.40 | Ceratix ® 8461 | 1) |
| 21.70 | CAB-381-20 (15%) | 2) |
| 11.80 | Acrylic resin of Example 7 | |
| 3.00 | Cymel 303 | 3) |
| 2.00 | Resimene HF 480 | 4) |
| 0.30 | Additol XL 480 | 5) |
| 14.00 | Aluminum paste 30% | 6), * |
| 4.00 | PMA | 7) |
| 3.00 | n-Butanol | |
| 7.00 | Butylacetate | |
| 10.80 | Xylene | |

1) Rheology modifier for solvent-borne effect coatings (BYK)
2) Cellulose acetate butyrate grade (Eastman)
3) Crosslinker (Cytec Ind.)
4) Flexibilizing carbamic resin based on butylurethane and formaldehyde (Cytec Ind.)
5). Leveling agent (Cytec Ind.)
6) Aluminum paste (Ekart)
7) PMA = methoxypropyl acetate (X)
* depends on the color desired, and thus can be a different pigment Example 24

A powder coating composition 8 as described in Table 6 was prepared. The Powder coating composition thus prepared was applied on sand-polished tiles. Tiles were preheated for 10 minutes at 200° C. and then transferred to a wooden support in order to have electrical insulation. Subsequently the powder was sprayed using a Gema Volstatic PCG1 without the application of an electrical field at a layer thickness of 200 μm (micrometers). The tile then was transferred to a convection oven where it was cured for 30 minutes at 200° C. Thereafter, the polyester coated tile was sand-polished, On top of the powder base coat, a further layer based on the formulation of Example 23 was applied via spraying) at a layer thickness of 15-20 μm. This layer was then air dried for about 5-10 minutes. After this step, the coating formulation of Example 11 was sprayed onto the tiles, as described earlier, standing at a temperature of from room temperature to at 180° C. After application of the coating, the temperature is maintained for 30 minutes at 200° C. The tile then is cooled down for evaluation. Thickness of the top coat: 60 μm (micrometers).

Ceramic tiles produced combined an excellent hardness with a very good gloss, crack, chemical, stain and heat shock resistance. Metallic effects can be achieved if desired.

Test results are summarized in Table 9:

TABLE 9

| Liquid coating composition | Hardness | Gloss | Crack resistance | Chemical resistance | Stain resistance | Heat shock resistance |
|---|---|---|---|---|---|---|
| Example 24 | Excellent | Good | Excellent | Excellent | Excellent | Excellent |

The invention claimed is:

1. A process for coating ceramic substrates comprising: applying, as a base coat layer to the substrate, a powder coating composition, and curing the applied composition; and applying, as a further layer, a liquid coating composition, and curing the applied liquid composition by exposure to heat,
   wherein the liquid coating composition used for making the further layer comprises at least one acrylic resin and/or at least one polyester resin,
   wherein the powder coating composition comprises at least one polyester having carboxy- and/or hydroxy-functional groups, and
   wherein the acrylic resin is a hydroxylated acrylic resin with a hydroxyl number of from 10 to 300 mg KOH/g and the polyester resin is a hydroxylated polyester with a hydroxyl number of from 10 to 300 mg KOH/g.

2. The process according to claim 1, wherein the powder coating composition comprises at least one hardener having functional groups reactable with the functional group(s) of the at least one polyester.

3. The process according to claim 2, wherein said polyester is selected from carboxy functionalized polyesters and the hardener is selected from polyepoxy compounds, β(beta)-hydroxyalkylamide containing compounds and mixtures thereof; or wherein said polyester is selected from hydroxy functionalized polyesters and the hardener is selected from blocked isocyanate cross-linking agents.

4. The process according to claim 1, wherein the powder coating composition is a radiation curable powder coating composition comprising at least one (meth)acryloyl group containing polyester and/or at least one (meth)acryloyl group containing epoxy resin.

5. The process according to claim 1, wherein the ceramic substrate is first preheated to a temperature above the glass transition temperature of the powder coating composition, after which the powder coating composition is applied to the substrate, and the ceramic substrate containing the powder is heated to a temperature between 120 and 300° C. for a curing time of from 1 to 60 minutes.

6. The process according to claim 1, wherein the liquid coating composition used for making the further layer further comprises an amino resin.

7. The process according to claim 1, wherein the liquid coating composition used for making the further layer is applied as a solution in organic solvents.

8. The process according to claim 1, wherein the process further comprises a step of providing a color image to the ceramic substrate.

9. The process of claim 8, wherein the color image is provided after the step of coating the ceramic substrate with the powder base coat and before the step of applying as a further layer the liquid coating composition.

10. The process according to claim 8, wherein the color image is applied to the ceramic substrate using a printing-ink sublimation technique or an inkjet printing technology.

11. The process according to claim 10, wherein the color image is applied using a radiation curable inkjet ink.

12. The process according to claim 1, wherein the powder base coat is optionally pigmented and wherein the liquid coat forms a top coat and is a clear coat.

13. The process according to claim 1, wherein the powder coating composition comprises at least one polyester having carboxy functional groups with an acid number of from 15 to 100 mg KOH/g, and/or at least one polyester having hydroxy functional groups with a hydroxy number of from 15 to 300 mg KOH/g.

14. The process according to claim 1, wherein the acrylic resin is a hydroxylated acrylic resin with a dynamic viscosity of from 50 to 40000 mPa·s and the polyester resin is a hydroxylated polyester with a dynamic viscosity of from 50 to 35000 mPa·s.

* * * * *